Nov. 7, 1950 K. L. MATHEWS 2,528,895
SEAL RING
Filed Oct. 30, 1945

INVENTOR.
KEITH L. MATHEWS
BY
ATTORNEYS.

Patented Nov. 7, 1950

2,528,895

UNITED STATES PATENT OFFICE 2,528,895

SEAL RING

Keith L. Mathews, San Francisco, Calif., assignor to The Pelton Water Wheel Company, San Francisco, Calif., a corporation of California Application October 30, 1945, Serial No. 625,469

2 Claims. (Cl. 309—23)

This invention relates in general to seal rings for effecting a seal between a piston and its associated cylinder and more particularly to a molded elastomer seal of this character.

Although molded elastomer seal rings are by no means new, those which have been used up to the present time are defective for several reasons. In molding articles of this kind an unpredictable degree of shrinkage takes place. For example, in molding a 10-inch ring there may be a shrinkage of one-fourth of an inch in its diameter. To compensate for such shrinkage, resort is sometimes had to an oversize mold. Although this expedient would serve the purpose provided that the amount of shrinkage were uniform and predictable, it unfortunately happens that the shrinkage which takes place varies from ring to ring, is unpredictable, and sometimes the resulting ring is of a size not falling within the required tolerance (from 1/64-inch to 1/32-inch in the case of the ten-inch diameter rings under discussion).

When undersized rings are encountered, resort is sometimes had to the use of shims placed in back of the ring for the purpose of making it contact with the cylinder. In doing this, however, the ring is confined on all sides to such an extent that in effect it becomes a rigid ring incapable of the deformation required to make it function properly and making it very difficult if not impossible to assemble the piston and cylinder.

In general the object of this invention is the provision of a seal ring of such form that regardless of shrinkage and of the use of shims it will nevertheless be sufficiently flexible to form the required seal and to be installed easily in the field.

A further object of the invention is the provision of a seal ring formed on its cylinder engaging face with a pair of opposed outwardly converging flanges and which with the body of the ring define an undercut pressure channel.

The invention possesses other advantageous features, some of which with the foregoing will be set forth at length in the following description where one form of the invention which has been selected for illustration in the drawing accompanying and forming a part of the present specification is outlined in full. In said drawing, one form of the invention is shown, but it is to be understood that it is not limited to such form, since the invention, as set forth in the claims, may be embodied in a plurality of forms.

Referring to the drawing.

Figure 1:
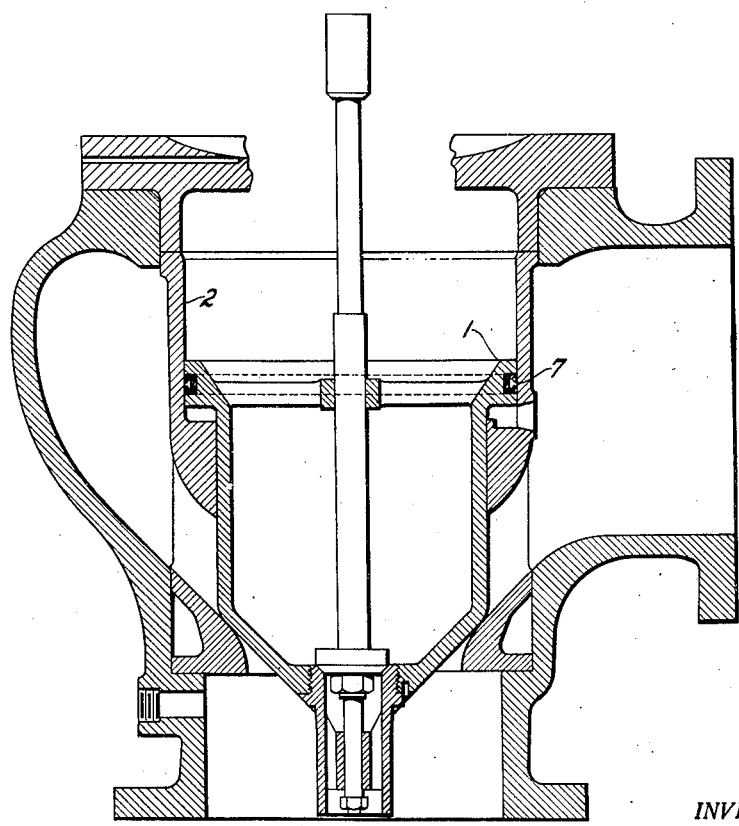
Fig. 1 is a vertical mid-section taken through a Pelton Surge Suppressor in which a seal ring embodying the objects of my invention has been incorporated.

As shown in these figures, a piston 1 is slidably disposed within a cylinder 2, the piston being formed with an annular seal ring receiving groove 3 defined by a rear wall 4 parallel to the axis of piston and by parallel side walls 5 and 6. Snugly accommodated within the groove 3 is an elastomer seal ring 7 having a body portion 7a, formed with a pair of conical surfaces defining a concave rear face 8 and provided with a pair of opposed outwardly converging wedge-shaped flanges 9 and 11. The free ends and inner faces of the flanges 9 and 11 together with the wall 12 define an undercut channel 13 into which these flanges may be compressed when the seal ring is in its operative position, as shown in full lines in Figs. 1 and 2.

Figure 2:
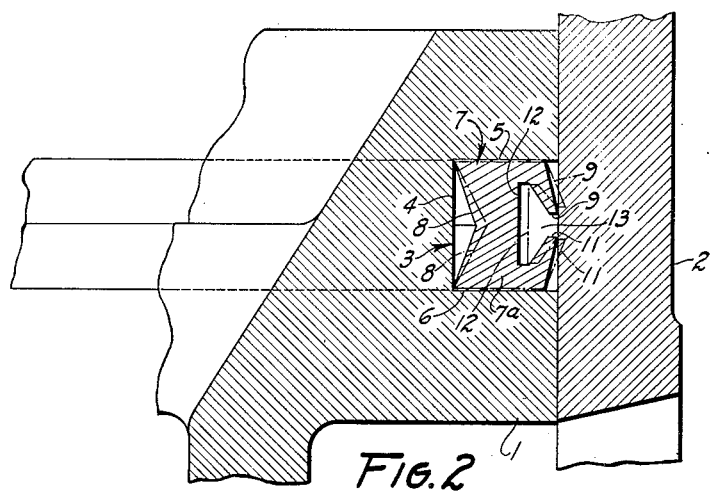
Fig. 2 is an enlarged sectional detail of the seal ring shown in Fig. 1.

The dimensions of the seal ring are such that in its uncompressed and unstrained condition it takes the form as shown in dotted lines in Fig. 2. When, however, the seal ring has been positioned within the groove 3 of the piston 1 and is confined therein by the cylinder 2, as shown in full lines in both Figs. 1 and 2, all of its portions are forced radially inwardly and at the same time the lateral walls of the seal ring are forced longitudinally against the side walls 5 and 6 of the groove 3.

If during the upward movement of the piston 1 relative to the cylinder 2, fluid leaks downwardly to the seal ring, this fluid will find its way between the free end of the flange 9 and the cylinder 2 into the undercut recess or channel 13 and will there exert an outward pressure against the lower flange 11 so as positively to seal it against the inner wall of the cylinder 2. On the downward movement of the piston 1 the reverse action will take place, fluid passing between the free end of the flange 11 and the cylinder 2 into the channel 13 and there exerting an outward pressure against flange 9 to seal it against the inner wall of the cylinder.

From the above description it will be seen that I have provided a seal ring formed on its rear face with a channel which permits the ring to be compressed rearwardly, and formed with an undercut channel adjacent its forward face into which the flanges of the ring may be compressed and which also serves as a compression chamber for positively sealing one or the other of the flanges against the inner wall of the cylinder. By resorting to this construction, it is unnecessary to mold a seal ring within the critical dimensions which would otherwise be required and it is immaterial whether different rings made on the same mold shrink to different degrees. Furthermore, if the ring is found to be too small, it can be shimmed out without in any way altering its functional characteristics and without making it difficult to assemble the piston and cylinder.

I claim:

1. In combination with a cylinder and piston wherein the piston is provided with an annular seal ring receiving channel; an elastomer seal ring snugly fitting within said channel, the inner face of said ring being non-reentrantly concave, said ring being formed adjacent its conical outer face with an undercut channel symmetrically disposed with respect to the medial plane of the ring, the maximum outer diameter of said ring being greater than the outer diameter of said piston when said ring is in its uncompressed and unstressed condition.

2. A seal ring comprising an annular elastic body adapted to lie snugly within an annular groove of rectangular cross-section, said body both when confined and when unconfined having in cross-section a concave non-reentrant rear face, exteriorly conical converging flanges on its outer periphery defining an undercut channel, and planar lateral walls.

KEITH L. MATHEWS.

REFERENCES CITED

The following references are of record in the file of this patent:

UNITED STATES PATENTS

| Number | Name | Date |
|---|---|---|
| 1,531,242 | Miller | Mar. 24, 1925 |
| 1,788,845 | Reynolds | Jan. 13, 1931 |
| 2,019,757 | Loweke | Nov. 5, 1935 |
| 2,201,571 | Aikman | May 21, 1940 |
| 2,208,620 | Baisch | July 23, 1940 |

FOREIGN PATENTS

| Number | Country | Date |
|---|---|---|
| 527,363 | Great Britain | Oct. 8, 1940 |

OTHER REFERENCES

"Product Engineering" article, page 103, February, 1945.